United States Patent [19]

Dix et al.

[11] 3,764,579

[45] Oct. 9, 1973

[54] ORGANOTIN COMPOUNDS AS COLOR AND CORROSION INHIBITORS IN THERMOPLASTIC POLYMER COMPOSITIONS CONTAINING FLAME

[75] Inventors: James S. Dix, Greenville; Ronald D. Mathis, Mauldin, both of S.C.

[73] Assignee: Phillips Petroleum Company

[22] Filed: June 28, 1971

[21] Appl. No.: 157,701

Related U.S. Application Data

[63] Continuation-in-part of Ser. No. 32,454, April 20, 1970, abandoned.

[52] U.S. Cl. ... 260/45.75 K, 260/41 B, 260/45.7 R, 260/45.75 B
[51] Int. Cl. .......................................... C08f 45/100
[58] Field of Search ............... 260/45.75 R, 45.7 P, 260/45.7 R, 45.95, 41 B

[56] References Cited
UNITED STATES PATENTS

| | | | |
|---|---|---|---|
| 3,418,263 | 12/1968 | Hindersinn et al. | 260/23 |
| 3,442,980 | 5/1969 | Grabowski | 260/880 |
| 3,591,507 | 7/1971 | Drake et al. | 260/45.7 |
| 3,441,524 | 4/1969 | Burger et al. | 260/45.7 |
| 3,368,916 | 2/1968 | Hattori et al. | 260/45.75 |
| 3,349,109 | 10/1967 | Lach | 260/45.75 |

*Primary Examiner*—Donald E. Czaja
*Assistant Examiner*—V. P. Hoke
*Attorney*—J. Arthur Young et al.

[57] ABSTRACT

Corrosion of metal surfaces in contact with thermoplastic polymer compositions containing halogenated hydrocarbon flame retardants is substantially reduced by the addition of organotin salts of mercapto-substituted carboxylic acids. Color of the polymer composition is improved by the use of organotin salts of olefinically unsaturated diacids. Inclusion of both types of organotin compounds both inhibits corrosion and stabilizes polymer color.

10 Claims, No Drawings

ORGANOTIN COMPOUNDS AS COLOR AND CORROSION INHIBITORS IN THERMOPLASTIC POLYMER COMPOSITIONS CONTAINING FLAME

BACKGROUND OF THE INVENTION

This is a continuation-in-part application of application serial No. 32,454 filed Apr. 20, 1970 now abandoned.

This invention relates to a method to incorporate corrosion inhibitive properties into flameproofed polymers. In another aspect, the invention relates to methods to color-stabilize polymers.

Thermoplastic polymer compositions are made difficultly flammable by the incorporation of flameproofing agents. Flameproofed plastic compositions, particularly the flameproofed polyolefins, are particularly useful for textile applications, particularly carpets, and also for the production of electrical insulating coatings for use in electrical wiring, appliances, and computers.

Various halogenated compounds are used, often together with antimony oxide, as flame retardants. However, compositions containing such retardants tend to be corrosive of metals with which they come into contact. Furthermore, the fire-resistant compositions often show undesirable effects of off-color, making it difficult to maintain manufacturing standards of uniform color, undesirably affecting color coding of insulation, and similar difficulties.

It is an object of our invention to provide flame retarded compositions which further are substantially non-corrosive. Another object is to provide color stabilized polymeric compositions.

It is an object of our invention to provide flame-proofed polymer compositions which are color stabilized and substantially noncorrosive. Other aspects, objects, and the several advantages of our invention will be apparent to one skilled in the art from the following description and appended claims.

SUMMARY OF THE INVENTION

We have discovered that the addition of certain organotin compounds to the flame retarded compositions overcomes the problem of corrosion, and improves the color stability of the compositions. Specifically, the corrosion inhibitive organotin compounds are salts of mercapto-substituted carboxylic acids, while those for color stabilization are similar but without the sulfur and are organotin salts of olefinically unsaturated diacids.

DETAILED DESCRIPTION OF THE INVENTION

In accordance with our invention, we have discovered that corrosion of ferrous metals and ferrous metal alloys induced by contact at elevated temperatures with flameproofed or flame-retarded polymer compositions containing one or more halogenated flameproofing agents is effectively suppressed by the addition of a small amount of at least one organotin salt of a mercapto-substituted carboxylic acid. Optionally, along with the sulfur-containing organotin compound corrosion inhibitor we add an organotin compound lacking the sulfur linkage, and which further additive appears to assist or enhance the effectiveness of the sulfur-containing organotin compound. The non-sulfur-containing organotin compound further provides color stabilization either with or without the organotin compound containing the sulfur linkage.

By precluding or suppressing the adverse corrosive tendencies of the flameproofed polymer composition, we provide corrosion inhibited blends of novel composition which can be processed at conventional processing temperatures and with conventional processing equipment while not corroding such equipment, thus avoiding the necessity of specialized equipment with costly corrosion resistant metal component parts. Furthermore, our inhibited formulations show consistently an improved color over those which are not inhibited. We also provide color stabilized flame-retardant compositions.

ORGANOTIN COMPOUNDS

The corrosion inhibitive additive is an organotin salt of a mercapto-substituted acid which can be represented by the formula:

(I) 

wherein each R is a radical, preferably hydrocarbyl, having from one to 12 carbon atoms and is alkyl including cycloalkyl, aryl, or combination thereof such as alkaryl and aralkyl, and the like; R preferably is an alkyl radical having from two to eight carbon atoms; R' is a divalent radical, preferably hydrocarbon, having from one to 12 carbon atoms, and is alkylene including cycloalkylene, arylene, alkenylene including cycloalkenylene, or combination thereof such as alkylenecycloalkylene and arylenedialkylene, and the like; and $x$ is an integer from 2 to 30, preferably from 4 to 20.

Exemplary of the organotin salts of mercapto-substituted carboxylic acids are those compounds represented by formula (I) in which each R is methyl, ethyl, butyl, isobutyl, hexyl, octyl, dodecyl, cyclohexyl, phenyl, benzyl, or any of the tolyls; each R' is methylene, ethylene, propylene, tetramethylene, octamethylene, dodecamethylene, 1,4-cyclohexylene, o-phenylene, 2-butenylene, 1,4-cyclohex-2-enylene, 1,3-cyclopentylenedimethylene, or p-phenylenedimethylene; and the like. Of course, any of the radicals can have other non-interfering substituents such as one or more halogens such as chlorine, bromine, or the like, without changing the character or scope of the additives represented by formula (I).

The corrosion inhibitive additive (I) is used in the range of from 0.01 php to 5 php, preferably from 0.03 to 0.5 php, i.e., parts of additive per 100 parts of polymer composition, by weight, exclusive of additives used for flameproofing or for other purposes common in polymer blends.

The color inhibitive additive is an organotin salt of an olefinically unsaturated diacid which can be represented by the formula:

(II) 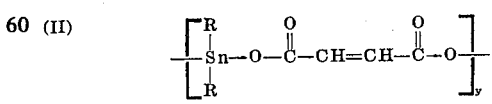

wherein each R is as defined above; and $y$ is an integer from 1 to 30, preferably from 1 to 3.

Exemplary of the organotin salts of an olefinically unsaturated diacid are those compounds represented by formula (II) in which each R is as typified above, without needlessly repeating such listings.

The color inhibitive additive (II) is used in the range of from 0.05 php to 5 php, preferably from 0.10 to 1 php, i.e., parts of additive per 100 parts of polymer composition, by weight, exclusive of additives used for flameproofing or for other purposes common in polymer blends.

Of course, in either (I) or (II), or admixture of either type, or of each, the average of any of $x$ or $y$ can be a non-integer, such as two or more species of (I) in admixture $x$ could have an average value of such as 6.3.

POLYOLEFINS

The polyolefins used in accordance with our invention are preferably polymers including copolymers of aliphatic 1-monoolefins having from two to eight carbon atoms. Such polymers typically may have densities in the range of from 0.9 to 0.97 gram per cc at 25° C., as determined by ASTM Method D 1505–63T, and flow rates in the range of from 0.2 to 35 as determined by ASTM Method D 1238–65T, conditions dependent on the polymer used, though useful polymers are not limited only thereto. These materials can be prepared, for example, using methods as described in U.S. Pat. No. 2,825,721 to John P. Hogan, et al. In most instances, these polymers are ethylene or propylene homopolymers, or are copolymers of ethylene or propylene with minor amounts of monomers copolymerizable therewith such as ethylene or propylene, 1-butene, 1-hexene, monovinyl-substituted aromatic compounds of up to 12 carbon atoms, and the like. The comonomer units incorporated into the polymeric molecules preferably account for from 0.5 to 10 per cent of the total copolymer weight, although larger amounts can be present. The polymeric materials often are crystalline as determined by X-ray diffraction at room temperature, with the crystallinities ranging from 80 per cent in the case of copolymers, and up to 95 per cent or more in the case of ethylene homopolymers.

While the polymonoolefins described hereinabove are presently preferred, our invention is broadly applicable to any of the thermoplastic polymer compositions, including the polydienes, i.e., the homopolymers and copolymers of conjugated dienes having from four to 10 carbon atoms per molecule; polymers of monovinyl-substituted aromatic compounds having from eight to 12 carbon atoms per molecule, including polystyrene; polymers of methyl acrylate and methyl methacrylate; and the copolymers, including random, block, and graft, of a diolefin, such as butadiene, with a vinyl aromatic such as styrene; terpolymers of butadiene, styrene, and acrylonitrile. Blends or mixtures of these polymers are also useful in this invention.

FLAMEPROOFING ADDITIVES

Additives useful in flameproofing the polymer compositions are halogenated organic compounds, preferably the halogenated bis(cycloalkyl)alkanes, or the halogenated cycloalkanes. These additives are used in amounts of from 1 to 20, more usually 1.5 to 3, parts by weight of additive per 100 parts by weight of the polymeric composition, e.g., the polyolefin or mixtures of polyolefins, excluding additives used for flameproofing or for other purposes common in polymer blends such as coloring agents, and the like.

The preferred bis(cycloalkyl)alkane type additives can be represented by the general formula:

(III) 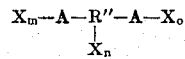

in which the symbols A represent cycloalkane rings having from five to eight carbon atoms in the ring; X represents chlorine or bromine substituted on the carbon atoms; R'' is a saturated acyclic hydrocarbon radical having from one to four carbon atoms and a valence of $n+2$; and $m$, $n$, and $o$ are zero or integers and are selected such that their respective values represent a total halogen content of the compound sufficient to impart flame retardancy to the polymer in which the compound is incorporated in minor effective amount, with a presently preferred halogen content of at least about 30 weight per cent, more preferably in the range of from 30 to 90 weight per cent. Examples of such compounds are:

bis(2,5-dibromocyclopentyl)dibromomethane
1,2-bis(3,4-dibromocyclohexyl)-1,2-dibromoethane
1-(3,5-dibromocyclohexyl)-2-(3,5-
 dichlorocyclohexyl)ethane
bis(2,4,6-tribromocycloheptyl)methane
1,3-bis(3,5,7-trichlorocyclooctyl)-2,2-
 dibromopropane
2,3-bis(2,3,4,5,6-pentachlorocyclohexyl)-1,4-
 dibromobutane
1,4-bis(2,3,4,5,6,7,8-heptabromocyclooctyl)-
 1,2,3,4-tetrabromobutane
1-(2,5-dichlorocyclopentyl)-2-(3,4-
 dibromocyclohexyl)-3-bromopropane
1,3-bis(3,4,5-tribromocyclohexyl)-2-(dibromomethyl)propane,
and the like.

Another preferred group of flame-proofing agents are the halogenated cycloalkanes which can be represented by the general formula:

(IV) 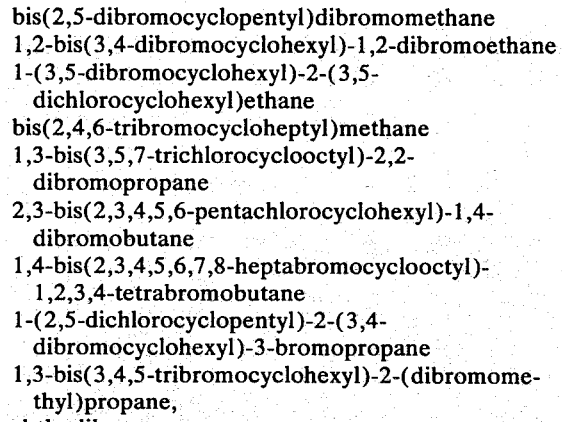

wherein R''' represents hydrogen, X, or saturated aliphatic hydrocarbyl radical having from one to four carbon atoms; and $z$ is an integer of 5 to 11, with $z = 11$ presently preferred. The individual compounds represented by formula (IV) can have up to about 20 carbon atoms overall.

The halogen content of compounds of formula (IV) should be sufficient to impart flame retardancy to the polymer with which it is incorporated in minor effective amount; presently preferred is a halogen content of the compound of at least about 30 weight per cent, more preferably from 30 to 90 weight per cent.

Examples of halogenated additives represented by formula (IV) include: dimers and trimers of butadiene or substituted butadienes which have been partially or completely halogenated with chlorine or bromine; 1,2,-3,4-tetrachlorocyclooctane; 1,2,5,6-tetrabromocyclooctane; 1,2,5,6,9,10-hexabromocyclododecane; 1,-2-dichloro-5,6,9,10-tetrabromocyclododecane;

bromocyclohexane; 1,2-dichloro-4-propylcyclohexane; 1,4-dichlorocyclohexane; 1,2-dibromo-4,5-dibutylcycloheptane; 1,2-dibromocyclononane; 1,2-dibromo-4,6-diethylcyclohexane; 1,2-dibromo-4-methyl-6,8,10-triisopropylcyclodecane; and the like.

Of course, as to either (III) or (IV) above an admixture of two or more of either or of each could be employed such that in such admixture the average value of any of $m$, $n$, $o$, $z$ could be a non-integer.

The halogenated additive (III) or (IV), or mixture, is used in an amount in admixture with the polymeric composition such that the total available halogen, i.e., from the additive, in the formulation is at least about 0.2 weight per cent of the total formulation.

While such types of additives are preferred, nevertheless, other halogenated flameproofing agents are useful within the concept of our invention and therefore the general term includes any known halogenated flameproofing agent or mixtures thereof which can be incorporated with thermoplastic polymers so as to provide the necessary flameproofing or flame-retarding effects.

Antimony oxide, preferably as the trioxide, frequently is used with the halogenated additive as tending to enhance the effectiveness of the organic flame retardants used. From about 0.5 to 20 parts of antimony oxide is used per 100 parts of the polymer composition. A weight ratio of halogenated additive to antimony oxide of from 0.5:1 to 5:1 generally is used, more usually nearer 2:1. Bismuth oxide and arsenic trioxide are considered the equivalent of antimony trioxide for this purpose, but are much less frequently used in commercial polymers.

EXEMPLARY DATA

The following examples and runs described therein will show the effectiveness of our invention, the highly effective corrosion inhibited nature in the blends described of these organotin salts of mercapto-substituted acids, the enhancing effect of the organotin salts of olefinically unsaturated diacids, and the color stabilizing benefits of the latter organotin compounds. The particular components described in the following runs should not be considered limitative of the scope and extent of our invention.

EXAMPLE

Polymer blends were prepared from 12 MF polypropylene fluff, 4.0 php 1,2-bis(3,4-dibromocyclohexyl)-1,2-dibromoethane, 2.0 php antimony trioxide, and 0.3 php of a known commercial antioxidant tetra[methylene(3,5-di-t-butyl-4-hydroxyhydrocinnamate)]methane. This basic flameproofed polymeric blend was then blended in portion with 0.25 php of each of a series of materials and including several control runs as well as the organotin inhibitors. In each case the final blend including the inhibitor or inhibitors was maintained at a temperature of 490° F. for 10 minutes in contact with a polished steel washer. The washer was then examined for corrosion of the surface area, and the polymer blend was examined for color:

Table I

| Run No. | Inhibitor | % of washer Surface Corroded | Color of extrudate after 5 minutes at 490° F. |
|---|---|---|---|
| 1 | None | 100 | Gray |
| 2 | Dibutyltin dilaurate | >90 | Gray |
| 3 | Epoxidized soybean oil [b] | >90 | off-white |
| 4 | Ba-Cd Phenolate [c] | >90 | dark gray |
| 5 | Organotin salt of an olefinically unsaturated diacid [a] [d] | >75 | White |
| 6 | Organotin salt of a mercapto-substituted acid [a] [e] | 0 | Pinkish gray |
| 7 | Additives of Runs 5 and 6 together [a] [d] [e] | 0 | White |

(a) Advance Division, Carlisle Chem. Co., New Brunswick, N.J.
(b) W.R. Grace & Co., Baltimore, Md.
(c) Argus Chem. Corp., Brooklyn, N.Y.
(d) An organotin salt of an olefinically unsaturated diacid according to formula (II) hereinabove wherein y equaled approximately 2, and each R was —$C_4H_9$—n.
(e) An organotin salt of a mercapto-substituted acid according to formula (I) hereinabove, wherein x equaled approximately 6.3, each R was —$C_4H_9$—n, and R' was —$CH_2$—$CH_2$—.

Runs 6 and 7 7 that the addition of the organotin salt of a mercapto-substituted acid completely eliminated washer corrosion. In Run 6, the polymer composition showed a pinkish gray coloration. Further incorporation into the polymer composition, including the organotin salt of a mercapto-substituted acid corrosion inhibitor, in Run 7 of 0.25 php organotin salt of an olefinically unsaturated diacid gave a white extrudate while maintaining complete corrosion inhibitive protection. Run 5 illustrates that the color stabilizer is effective without the corrosion inhibitor, but that the color stabilizer alone does not inhibit corrosion.

Further runs were made with polyethylene, and with polystyrene, employing other examples of formula (II) wherein R was octyl, and data resulting show similar color stabilization.

The compositions of my invention can be produced in various manners. The polymer plus flameproofing agent plus organotin compound or compounds can be blended or mixed together in any order using conventional processing equipment known to the art. For example, batch type equipment such as a Banbury mixer or a two-roll mill can be employed, or a finely ground admixture can be compounded in a screw-type extruder or in an extrusion press. Additives can be added with the major components, or after admixing the major components. Minor components can be dissolved in a suitable solvent, individually or together, and such solution or dispersion admixed with the major polymeric compositions and the solvent subsequently removed by evaporation and the like. Masterbatch techniques are appropriate, of course.

It is to be understood that the compositions of this invention also can have various other additives incorporated therein including fillers, dyes, pigments, plasticizers, anti-static agents, and the like, according to the needs of the particular formulation and product end-use requirements.

Reasonable variations and modifications are possible within the scope of our disclosure without departing from the intended scope and spirit thereof.

We claim:
1. A stabilized flameproofed thermoplastic composition which comprises:
   a. at least one homopolymer or copolymer selected from the group consisting of polymonoolefins, polydienes, polymers of monovinyl-substituted aromatic compounds, and acrylate polymers, and b. from 1.5 to 20 parts by weight per 100 parts by weight of said polymer of a halogenated bis(cycloalkyl)alkane flameproofing agent which can be represented by the formula (III) 

wherein A is a cycloalkane ring having from five to eight carbon atoms in the ring, X is chlorine or bromine substituted on said A, R'' is a saturated acyclic hydrocarbon radical having from one to four carbon atoms and a valence of $n+2$, $m + n + o$ are zero or integers such that (III) has a halogen content of from 30 to 90 weight percent of said flameproofing agent;

and (III) is used in said flameproofed thermoplastic composition in an amount sufficient to provide at least 0.2 weight percent available halogen to said thermoplastic composition; and c. from 0.01 to 5 parts by weight per 100 parts by weight of said polymer of (I) 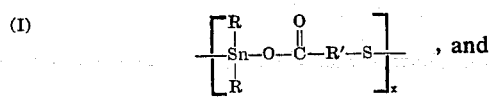, and d. 0.05 to 5 parts by weight per 100 parts by weight of said polymer of (II) 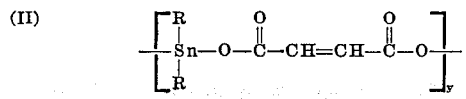

wherein in (I) and (II) each R is a radical having from 1 to 12 carbon atoms and is alkyl, or aryl, or combination thereof, R' is a divalent radical having from one to 12 carbon atoms and is alkylene, arylene, or alkenylene, or combination thereof, and $x$ is from 2 to 30 and $y$ is from 1 to 30.

2. The composition according to claim 1 wherein said flameproofing agent is 1,2-bis(3,4-dibromocyclohexyl)-1,2-dibromoethane.

3. The composition of claim 2 wherein in said (I) $x$ = about 6.3, each R is $-C_4H_9$, and R' is $-CH_2-CH_2-$; and wherein in said (II) $y =$ about 2, and each R is $-C_4H_9$ or octyl.

4. The composition according to claim 3 wherein said thermoplastic polymer is a polymer of 1-monoolefin and is polypropylene.

5. The composition according to claim 1 wherein said polymonoolefin is a homopolymer or copolymer of 1-monoolefins of from two to eight carbon atoms.

6. The composition according to claim 5 wherein the copolymer is a polymer of the 1-monoolefin copolymerized with up to 10 weight percent of at least one vinyl aromatic compound of up to 12 carbon atoms.

7. The composition according to claim 1 further containing from 0.05 to about 20 parts by weight per 100 parts of said polymer composition of antimony oxide.

8. A stabilized flameproofed thermoplastic composition which comprises:
a. polypropylene,
b. 4 parts by weight, per 100 parts by weight of said polypropylene, of 1,2-bis(3,4-dibromocyclohexyl)-1,2-dibromoethane as a flame retardant,
c. 0.25 parts by weight, per 100 parts by weight of said polypropylene of (I) 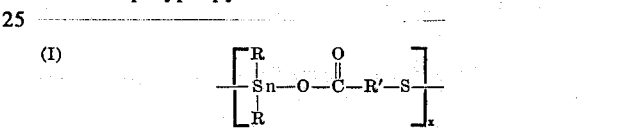

and 0.25 parts by weight, per 100 parts by weight of said polypropylene of (II) 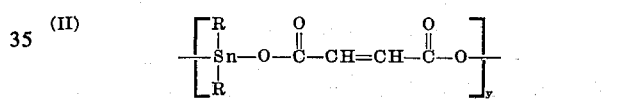

wherein each R is n-$C_4H_9$, $x$ is 6.3, and $y$ is approximately 2.

9. The composition according to claim 8 further containing 2 parts by weight per 100 parts of said polypropylene composition of antimony oxide.

10. The composition according to claim 5 wherein said polymonoolefin has a density of from 0.9 to 0.97 grams per cc and a flow rate from 0.2 to 35, and said 1-monoolefin is propylene.

* * * * *